United States Patent
Shen

(10) Patent No.: US 12,114,125 B2
(45) Date of Patent: Oct. 8, 2024

(54) NOISE CANCELLATION PROCESSING METHOD, DEVICE AND APPARATUS

(71) Applicants: INVENTEC APPLIANCES (PUDONG) CORPORATION, Shanghai (CN); INVENTEC APPLIANCES (SHANGHAI) CO. LTD., Shanghai (CN); INVENTEC APPLIANCES CORPORATION, New Taipei (TW)

(72) Inventor: Wei Shen, Shanghai (CN)

(73) Assignees: INVENTEC APPLIANCES (PUDONG) CORPORATION, Shanghai (CN); INVENTEC APPLIANCES (SHANGHAI) CO. LTD., Shanghai (CN); INVENTEC APPLIANCES CORPORATION, New Taipei (TW)

( * ) Notice: Subject to any disclaimer, the term of this patent is extended or adjusted under 35 U.S.C. 154(b) by 276 days.

(21) Appl. No.: 17/846,708

(22) Filed: Jun. 22, 2022

(65) Prior Publication Data
US 2023/0164477 A1    May 25, 2023

(30) Foreign Application Priority Data
Nov. 24, 2021    (CN) .......................... 202111407413.8

(51) Int. Cl.
H04R 1/10    (2006.01)
G10L 17/02    (2013.01)
G10L 17/04    (2013.01)

(52) U.S. Cl.
CPC ............ H04R 1/1083 (2013.01); G10L 17/02 (2013.01); G10L 17/04 (2013.01)

(58) Field of Classification Search
CPC ........ H04R 1/1083; G10L 17/02; G10L 17/04
(Continued)

(56) References Cited

U.S. PATENT DOCUMENTS

2003/0009333 A1    1/2003    Sharma et al.
2004/0260470 A1    12/2004    Rast
(Continued)

FOREIGN PATENT DOCUMENTS

CN    105719659 A    6/2016
CN    214226506 U    9/2021
TW    202046061 A    12/2020

*Primary Examiner* — Vivian C Chin
*Assistant Examiner* — Douglas J Suthers
(74) *Attorney, Agent, or Firm* — Li & Cai Intellectual Property (USA) Office

(57) ABSTRACT

A noise cancellation processing method, device and apparatus are provided. The noise cancellation processing method includes: collecting first voice data in a surrounding environment by using a noise-cancelling earphone in response to detecting that the noise-cancelling earphone is in a wearing state and a noise cancellation mode is enabled; extracting to-be-recognized voiceprint feature information according to the first voice data; identifying similarities between registered voiceprint feature information stored in a registered voiceprint database and the to-be-recognized voiceprint feature information entry by entry; and in response to at least one of the similarities being greater than a first preset threshold, performing a preset action in the noise-cancelling earphone.

12 Claims, 6 Drawing Sheets

(58) Field of Classification Search
USPC .......................................................... 381/71.6
See application file for complete search history.

(56) References Cited

U.S. PATENT DOCUMENTS

| | | | |
|---|---|---|---|
| 2013/0121494 A1* | 5/2013 | Johnston | H04R 1/1041 381/56 |
| 2015/0201275 A1* | 7/2015 | Lee | H04R 1/1041 381/74 |
| 2015/0296286 A1* | 10/2015 | Prentice | H04R 1/1083 381/71.6 |
| 2016/0217793 A1* | 7/2016 | Gorodetski | G10L 17/04 |

* cited by examiner

NOISE CANCELLATION PROCESSING METHOD, DEVICE AND APPARATUS

CROSS-REFERENCE TO RELATED PATENT APPLICATION

This application claims the benefit of priority to China Patent Application No. 202111407413.8, filed on Nov. 24, 2021 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to signal processing technology, and more particularly to a noise cancellation processing method and a noise cancellation processing device.

BACKGROUND OF THE DISCLOSURE

With the advancement of technology, the noise cancellation performance of noise-cancelling earphone has been under continuous improvement, and are now considerably more popular among earphone users. Noise-cancelling earphone can effectively suppress ambient noise, allowing the wearer to pleasantly enjoy audio data even in a noisy environment, and to listen to audio streams in clearer sound quality.

However, since the noise-cancelling earphone simultaneously suppresses noise from the environment and voices of people in the vicinity, it can be difficult for the user to hear someone calling out to them with the earphone on, leading to awkward or even downright embarrassing moments in everyday interaction for social beings.

SUMMARY OF THE DISCLOSURE

In response to the above-referenced technical inadequacies, the present disclosure provides a noise cancellation processing method and a noise cancellation processing device to address issues involving the obstruction of normal communication between people while noise cancellation is in effect.

In one aspect, the present disclosure provides a noise cancellation processing method that includes the following steps:
  collecting first voice data in a surrounding environment in response to a noise-cancelling earphone being in a wearing state and a noise cancellation mode being enabled;
  extracting to-be-recognized voiceprint feature information according to the first voice data;
  identifying similarities between registered voiceprint feature information stored in a registered voiceprint database and the to-be-recognized voiceprint feature information entry by entry; and
  in response to at least one of the similarities being greater than a first preset threshold, performing a preset action in the noise-cancelling earphone, such that an external sound is transmitted to a target user wearing the noise-cancelling earphone.

Preferably, before performing the step of identifying the similarities between the registered voiceprint feature information stored in the registered voiceprint database and the to-be-recognized voiceprint feature information entry by entry, the noise cancellation processing method further includes:
  collecting second voice data corresponding to historical dialogues of the target user wearing the noise-cancelling earphone in a past first preset time period; and
  extracting all voiceprints in the second voice data, and registering N ones of the voiceprints with highest frequencies among all of the voiceprints to form the registered voiceprint database, in which N is an integer.

Preferably, the registered voiceprint feature information further includes location information, and before the step of identifying the similarities between the registered voiceprint feature information stored in the registered voiceprint database and the to-be-recognized voiceprint feature information entry by entry, the noise cancellation processing method further includes:
  grouping the registered voiceprint feature information based on the associated location information to form a first mapping relationship that defines a correspondence between the location information and at least one voiceprint group;
  obtaining a current location information of the noise-cancelling earphone; and
  determining, based on the first mapping relationship, a target voiceprint group that matches with the current location information.

The step of identifying the similarities between the registered voiceprint feature information stored in the registered voiceprint database and the to-be-recognized voiceprint feature information entry by entry further includes:
  identifying the similarities between the registered voiceprint feature information in the target voiceprint group and the to-be-recognized voiceprint feature information entry by entry.

Preferably, the step of collecting the first voice data in the surrounding environment includes simultaneously collecting current location information of the noise-cancelling earphone.

The step of identifying the similarities between the registered voiceprint feature information stored in the registered voiceprint database and the to-be-recognized voiceprint feature information entry by entry further includes:
  establishing a training set based on historical dialogue data of the target user wearing the noise-cancelling earphone at different locations;
  training, based on the training set, a preset network model to obtain an initial network model, in which parameter weights for a same interlocutor at different locations in the initial network model are different, and the parameter weights are associated with the locations;
  determining, based on the current location information, the parameter weights in the initial network model to form a target network model; and
  identifying, based on the target network model, the similarities between the registered voiceprint feature information stored in the registered voiceprint database and the to-be-recognized voiceprint feature information entry by entry.

Preferably, the step of establishing the training set based on the historical dialogue data of the target user wearing the noise-cancelling earphone at different locations includes:

acquiring the historical dialogue data of the target user wearing the noise-cancelling earphone at different locations within a historical time period to serve as initial training data, in which the historical dialogue data includes data on changes in a worn or unworn status of the noise-cancelling earphone within a preset time period after a start of a dialogue;

selecting, from the initial training data, the historical dialogue data corresponding to a switching of the noise-cancelling earphone from the wearing state to a non-wearing state within the preset time period after the start of the dialogue to serve as target training data; and establishing the training set based on the target training data.

Preferably, before performing the step of identifying the similarities between the registered voiceprint feature information stored in the registered voiceprint database and the to-be-recognized voiceprint feature information entry by entry, the noise cancellation processing method further includes:

registering specified voiceprint feature information to form the registered voiceprint database.

Preferably, the noise cancellation processing method further includes:

acquiring the registered voiceprint feature information corresponding to the similarities greater than the first preset threshold as a target voiceprint, and continuing to collect third voice data from the surrounding environment; and in response to the target voiceprint and the voiceprint feature information of the target user not being recognized from the third voice data within a second preset time period, the noise cancellation mode of the noise-cancelling earphone is enabled.

Preferably, the step of collecting the first voice data in the surrounding environment further includes:

collecting voice data with an audio intensity from the noise-cancelling earphone greater than a second preset threshold in the surrounding environment of the noise-cancelling earphone as the first voice data.

Preferably, the step of identifying the similarities between the registered voiceprint feature information stored in the registered voiceprint database and the to-be-recognized voiceprint feature information entry by entry further includes:

in response to detecting that a power of the noise-cancelling earphone is lower than a third preset threshold and that a connection between the noise-cancelling earphone and a terminal device is established, disabling the noise cancellation mode of the noise-cancelling earphone.

Preferably, the preset action is to disable the noise cancellation mode or enable a transparency mode.

Compared with the conventional technology, the present disclosure has the following advantages and effects:

In the noise cancellation processing method and the noise cancellation processing device provided by the present disclosure, the voice data in the environment is detected, and in response to recognizing the registered voiceprint feature information, a preset action is performed in the noise-cancelling earphone, such as disabling the noise cancellation mode, thereby addressing issues where wearers of the earphone being non-responsive to other people, thus improving the communication experience between the wearer and others.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
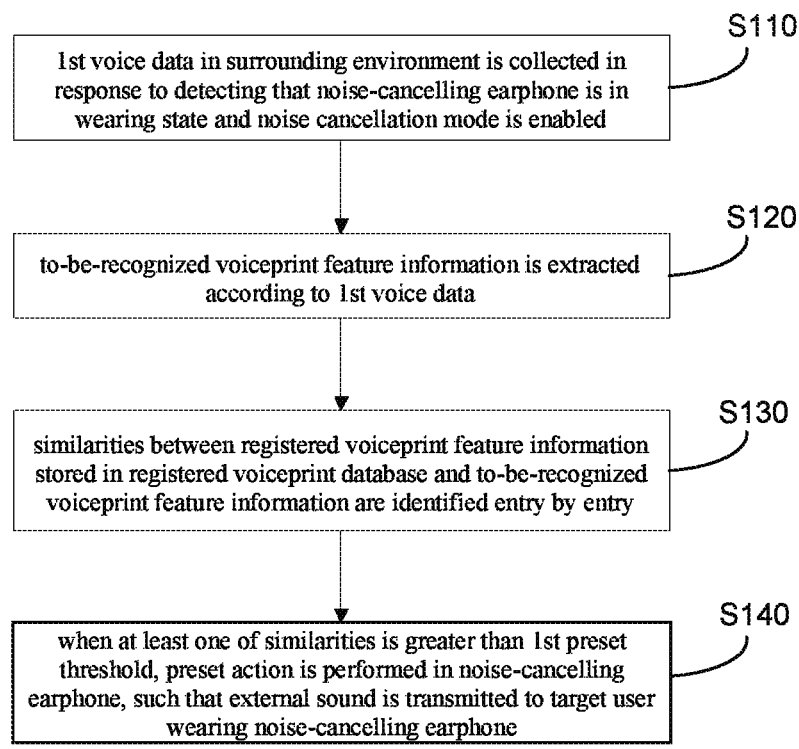
FIG. 1 is a schematic diagram of a noise cancellation processing method according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A structure and functions of a noise-cancelling earphone are exemplarily provided in the present disclosure. The noise-cancelling earphone can include a plurality of sound modes, such as a noise cancellation mode, a normal mode, and a transparency mode. The noise cancellation mode includes an active noise cancellation function. The active noise cancellation function is realized by generating reverse sound waves equal to external noises through a noise cancellation system to neutralize the noises, thereby achieving an effect of noise cancellation. The normal mode is a mode in which no additional processing is applied to the sound, and an audio played in the earphone possesses an audio effect of an original audio. The transparency mode refers to a mode where ambient sound data is not muted, such that the user can clearly hear ambient sounds from the external environment, allowing the user to normally engage in outside communication.

As shown in FIG. 1, one embodiment of the present disclosure discloses a noise cancellation processing method for a noise-cancelling earphone, and the method includes the following steps:

In step S110, first voice data in a surrounding environment is collected in response to detecting that the noise-cancelling earphone is in a wearing state and a noise cancellation mode is enabled. Specifically, audio data of people speaking in the surrounding environment is collected as the first voice data.

The detection of the above wearing status can be realized by technologies such as infrared sensors. For example, when a second end of the earphone can detect an infrared signal emitted by a first end, the earphone is determined to be in the wearing status. If the second end cannot detect the infrared signal, the earphone is determined to not be in the wearing status. The detection can also be implemented using existing technologies, details of which will not be described in the present disclosure.

In one embodiment of the present disclosure, the voice data with an audio intensity from the noise-cancelling earphone greater than a second preset threshold in the surrounding environment can be collected in this step as the first voice data. That is, taking a location of the noise-cancelling earphone as a collecting point, the audio data with the audio intensity greater than the second preset threshold are selected from the collected voice data in the surrounding environment as the first voice data. That is to say, since a conversation between two people is usually held in a face-to-face manner, the present embodiment can only collect the audio data of a speaker who is close to the earphone wearer, such as to benefit a detection accuracy of the voice data in the conversation. Exemplarily, the above-mentioned second preset threshold can be 60 decibels (dB), but the present disclosure is not limited thereto.

In step S120, to-be-recognized voiceprint feature information is extracted according to the first voice data. Specifically, for example, after a voice activity detection (VAD) is performed on the first voice data, voice enhancement is performed, valid voice data is extracted, and then voiceprint features are extracted, so that the to-be-recognized voiceprint feature information in the surrounding environment can be obtained. In other embodiments, the implementation of this step can also be implemented with reference to the existing technologies.

In step S130, similarities between registered voiceprint feature information stored in a registered voiceprint database and the to-be-recognized voiceprint feature information are identified entry by entry. Specifically, the above-mentioned registered voiceprint database is a voiceprint database composed of voiceprints to be recognized. In a specific implementation, voiceprints of one or more designated persons can be extracted and registered to establish the registered voiceprint database, or voiceprints of all people in a certain environment (such as a workplace, office building, or home of the wearer) can be extracted and registered to establish the registered voiceprint database.

In one embodiment of the present disclosure, if the earphone wearer needs to identify the voiceprints of one or more specified persons from the first voice data of the environment, the above-mentioned registered voiceprint database can be registered based on voiceprint feature information of the specified persons, that is, registered based on preset voiceprint feature information.

The above similarities are calculated by comparing the registered voiceprint feature information with the to-be-recognized voiceprint feature information based on a voiceprint comparison algorithm. Each record of the registered voiceprint feature information in the registered voiceprint database corresponds to one of the calculated similarities, which is a one-to-one relationship. For the implementation of the above voiceprint comparison algorithm, reference can be made to relevant existing technologies; for example, Euclidean distance or cosine similarity can be used, but will not be described in detail in this embodiment.

In step S140, when at least one of the similarities is greater than a first preset threshold, a preset action is performed in the noise-cancelling earphone, such that an external sound is transmitted to a target user wearing the noise-cancelling earphone. That is, as long as there is one of the similarities corresponding to all the registered voiceprint feature information that is calculated in the above steps to be greater than the first preset threshold, the noise cancellation mode of the earphone is disabled or the transparency mode is enabled, such that the sound of others speaking from the outside can pass through the earphone and be transmitted to the ear of the earphone wearer. In the present embodiment, the preset action is to disable the noise cancellation mode or enable the transparency mode. The above-mentioned first preset threshold can be set according practical requirements, such as 90% for example, but the present disclosure is not limited thereto.

In one embodiment, as long as there is one of the similarities greater than the first preset threshold, the calculation of the similarities corresponding to the subsequent registered voiceprint feature information can be stopped, so as to improve a detection efficiency of the voiceprints.

Figure 2:
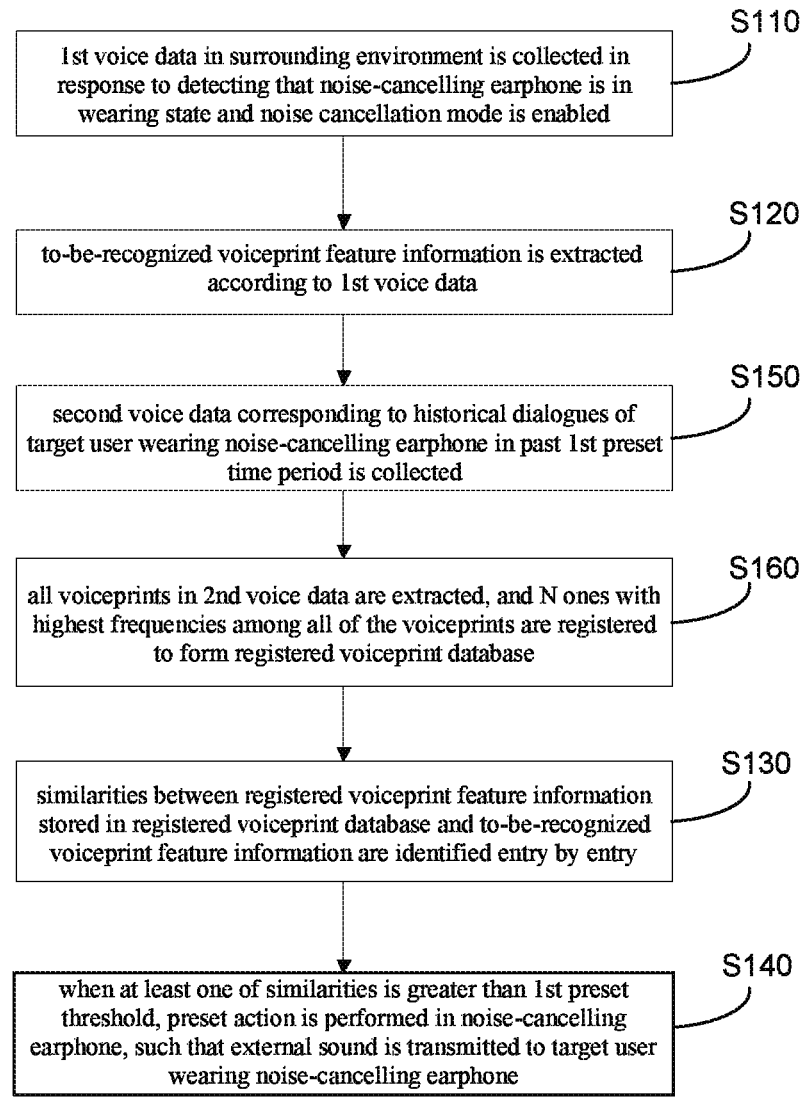
FIG. 2 is a schematic diagram of a noise cancellation processing method according to another embodiment of the present disclosure.

In another embodiment of the present disclosure, another noise cancellation processing method is disclosed. As shown in FIG. 2, based on the above-mentioned embodiment, the method further includes the following steps between step S120 and step S130:

In step S150, second voice data corresponding to historical dialogues of the target user wearing the noise-cancelling earphone in a past first preset time period is collected.

In step S160, all voiceprints in the second voice data are extracted, and N ones with highest frequencies among all of the voiceprints are registered to form the registered voiceprint database, in which N represents a positive integer.

Specifically, the target user who wears the noise-cancelling earphone is the wearer of the noise-cancelling earphone, that is, the user of the noise-cancelling earphone. The above-mentioned historical dialogue refers to a dialogue that must include vocal participation of the above-mentioned target user, and can be a dialogue between the target user and another party, or a conversation between the target user and two or more people.

The voiceprint feature information contained in the registered voiceprint database is associated with N people with the highest frequency in daily conversations with the target user, which is conducive to improving the efficiency and accuracy of voiceprint recognition and detection, thereby improving the user's communication experience.

The above-mentioned first preset time period can be set as required, and can, for example, be one month before the current time, but is not limited in the present disclosure.

Figure 3:
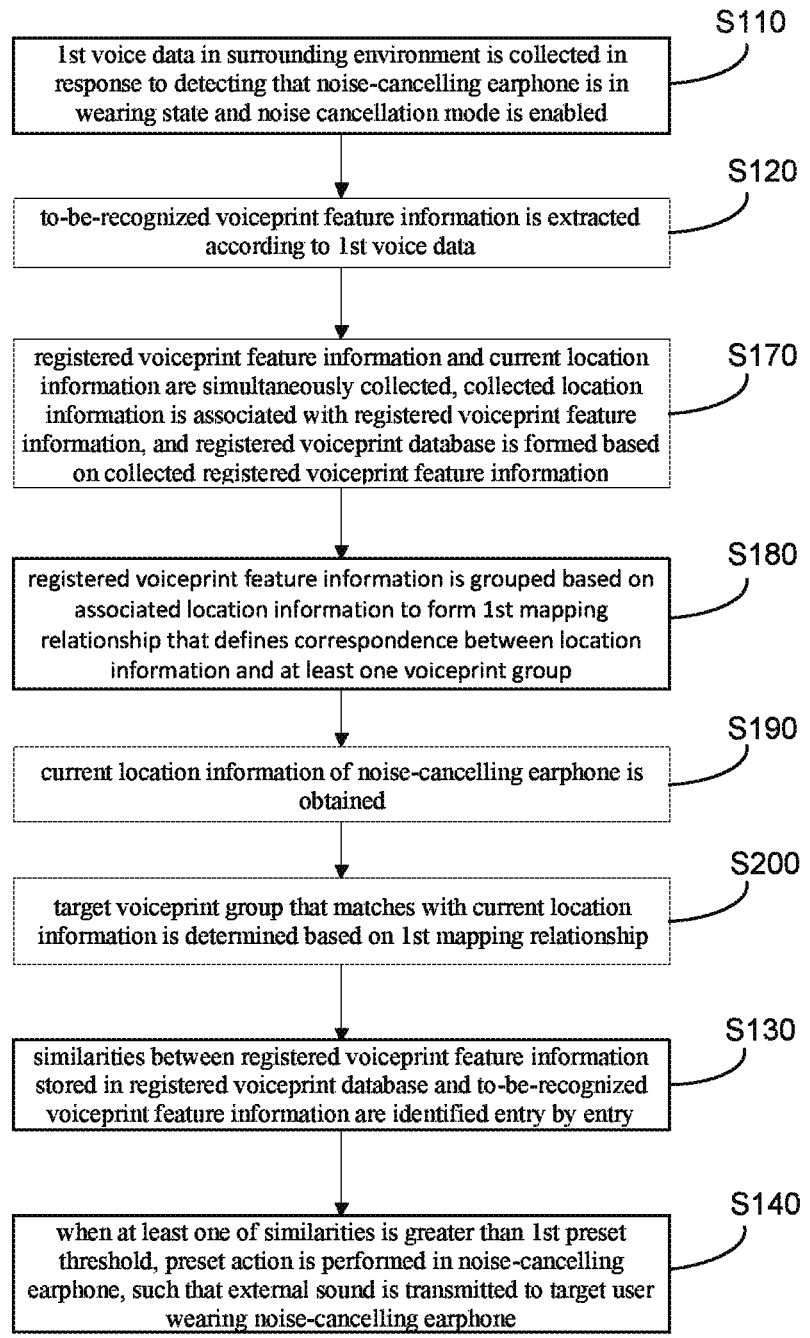
FIG. 3 is a schematic diagram of a noise cancellation processing method according another embodiment of the present disclosure.

In another embodiment of the present disclosure, another noise cancellation processing method is disclosed. As shown in FIG. 3, based on the above-mentioned embodiment, the method further includes the following steps between step S120 and step S130:

In step S170, the registered voiceprint feature information and current location information are simultaneously collected, the collected location information is associated with the above registered voiceprint feature information, and the registered voiceprint database is formed based on the collected registered voiceprint feature information. It should be noted that the location information refers to a collecting location corresponding to the voiceprint feature information, that is, a location from where human voices are emitted.

In step S180, the registered voiceprint feature information is grouped based on the associated location information to form a first mapping relationship that defines a correspondence between the location information and at least one voiceprint group. Each group of the registered voiceprint feature information after grouping corresponds to one record of the location information, and each group of the registered voiceprint feature information is one of the above-mentioned at least one voiceprint groups.

In step S190, a current location information of the noise-cancelling earphone is obtained.

In step S200, a target voiceprint group that matches with the current location information is determined based on the first mapping relationship.

Step S130 includes:
identifying the similarities between the registered voiceprint feature information in the target voiceprint group and the to-be-recognized voiceprint feature information entry by entry.

Specifically, for example, in homes and at offices, groups of people who often talk to the wearer of the noise-cancelling earphone may be different, so that the collected registered voiceprint feature information can be grouped for different locations. For example, family interlocutors and company interlocutors can be categorized into different groups. In this way, when voiceprint recognition is performed, the range of to-be-compared voiceprints can be narrowed based on geographic location information, which is conducive to improving the efficiency and accuracy of voiceprint recognition and detection and thereby improving the user's communication experience.

Figure 4:
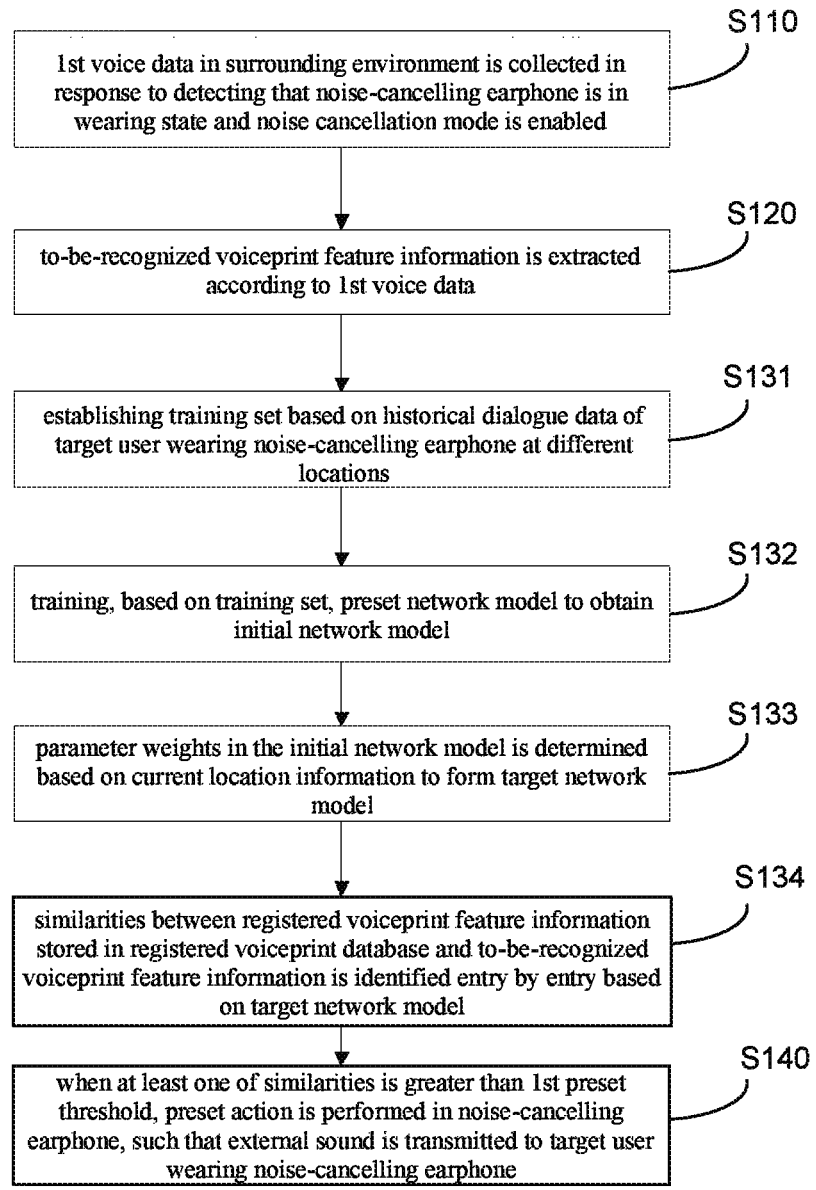
FIG. 4 is a schematic diagram of a noise cancellation processing method according to another embodiment of the present disclosure.

In another embodiment of the present disclosure, another noise cancellation processing method is disclosed. As shown in FIG. 4, based on the above-mentioned embodiment, step S110 can include the following:
in response to detecting that the noise-cancelling earphone is in the wearing status and the noise cancellation mode is enabled, collecting the current location information of the noise-cancelling earphone and the first voice data in a surrounding environment.

Step S130 includes:
Step S131: establishing a training set based on historical dialogue data of the target user wearing the noise-cancelling earphone at different locations. Specifically, the implementation of this step can be conducted with reference to the foregoing embodiments. The historical dialogue data can be dialogue data between the earphone wearer and other persons in the past first preset time period. Different locations can include homes and offices.

Step S132: training, based on the training set, a preset network model to obtain an initial network model. Parameter weights for a same interlocutor at different locations in the initial network model are different, and the parameter weights are associated with the locations. Specifically, the implementation of the preset network model can be implemented with reference to the existing technologies, such as an implementation based on a convolutional neural network model of the existing technologies. During a specific implementation, in a preset network model of this step, each location can correspond to a set of model parameter weight combinations. Each location can also correspond to an initial network model in which each parameter weight is a fixed value. That is, there can be a plurality of initial network models, and each location corresponds to one of the plurality of initial network models.

In step S133, the parameter weights in the initial network model is determined based on the current location information to form a target network model. That is, this step determines the model parameter weights corresponding to the current location information.

In step S134, the similarities between the registered voiceprint feature information stored in the registered voiceprint database and the to-be-recognized voiceprint feature information is identified entry by entry based on the target network model. Specifically, the registered voiceprint feature information and the above-mentioned to-be-recognized voiceprint feature information are used as an input of the target network model, which outputs the similarities between the two voiceprints.

Figure 5:
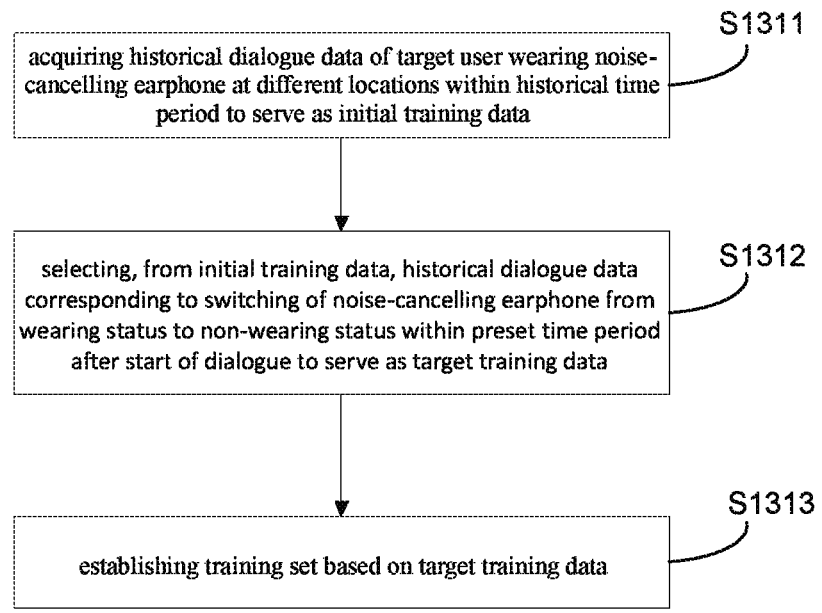
FIG. 5 is a schematic flowchart of step S131 in the noise cancellation processing method according to one embodiment of the present disclosure.

As shown in FIG. 5, in another embodiment of the present disclosure, the above step S131 includes:
Step S1311: acquiring the historical dialogue data of the target user wearing the noise-cancelling earphone at different locations within a historical time period to serve as initial training data. The historical dialogue data includes data on changes in a wearing state of the noise-cancelling earphone within a preset time period after a start of a dialogue.

Step S1312: selecting, from the initial training data, the historical dialogue data corresponding to a switching of the noise-cancelling earphone from the wearing status to a non-wearing status within the preset time period after the start of the dialogue to serve as target training data.

Step S1313: establishing the training set based on the target training data.

In the present disclosure, the data on changes in the wearing state can be of four types: switching from the wearing status to the non-wearing status, maintaining the wearing status, maintaining the non-wearing status, or switching from the non-wearing status to the wearing status. In general, the dialogue or conversation begins at the moment of acknowledgement, from when the wearer (i.e., the target user) hears or sees someone greeting him. The wearer then takes off the earphone to participate in the conversation. Therefore, in this embodiment, the historical dialogue data of the conversation even after the wearer takes off the earphone is utilized, such that the extracted historical dialogue data has higher training value, and the obtained model can recognize and detect the voiceprint more accurately, so as to improve an efficiency of voiceprint recognition for the earphone.

That is, the present disclosure filters the training data according to information of the changes in the worn or unworn status, and the historical dialogue data of the wearer having a conversation with a person after each time the earphone is taken off can be selected as the training data, such that the training accuracy of the training set is higher, which can improve the accuracy and efficiency of subsequent voiceprint detection, and which in turn helps to improve user's communication experience.

In another embodiment, the step S1312 can include the following: selecting, from the initial training data, the historical dialogue data corresponding to a switching of the noise-cancelling earphone from the wearing status to a non-wearing status within a preset time period before the target user starts speaking in the dialogue, as the target training data.

The above-mentioned historical time period and the preset time period can be set according to practical requirements. For example, the historical time period can be one month before a current time, the preset time period can be 5 seconds, but the present disclosure is not limited thereto.

In another embodiment of the present disclosure, another noise cancellation processing method is disclosed. On the basis of the above-mentioned embodiment, the method can also include the following steps:

The registered voiceprint feature information corresponding to the similarities greater than the first preset threshold in step S140 is acquired as the target voiceprint, and third voice data of the surrounding environment continues to be collected.

In response to the target voiceprint and the voiceprint feature information of the target user being not recognized from the third voice data within a second preset time period, the noise cancellation mode of the noise-cancelling earphone is enabled.

Specifically, when the voiceprints of the earphone wearer and the aforementioned interlocutor are not detected from the audio data in the surrounding environment, the noise cancellation mode of the earphone continues to be automatically enabled to perform the noise cancellation. In other embodiments, the noise cancellation mode of the earphone can also be enabled after receiving a trigger signal, such as a trigger signal generated manually by a target user.

The above-mentioned second preset time period can be set as required, such as 30 seconds, but the present disclosure is not limited thereto.

In another embodiment of the present disclosure, another noise cancellation processing method is disclosed. The method is based upon the above-mentioned embodiment, in which step S130 further includes:

detecting whether a power of the noise-cancelling earphone is lower than a third preset threshold, and in response to detecting that the power of the noise-cancelling earphone is lower than the third preset threshold and that a connection between the noise-cancelling earphone and a terminal device is established, the similarities between registered voiceprint feature information stored in the registered voiceprint database and the to-be-recognized voiceprint feature information are identified entry by entry through the terminal device. In response to detecting that the power of the noise-cancelling earphone is not lower than the third preset threshold, the similarities between registered voiceprint feature information stored in the registered voiceprint database and the to-be-recognized voiceprint feature information are identified entry by entry based on the noise-cancelling earphone. Then, the above-mentioned step S140 is performed.

Specifically, the above-mentioned terminal device can be a device such as a mobile phone or a tablet computer, and the noise-cancelling earphone can be connected to the terminal device via Bluetooth. Then, when the power of the noise-cancelling earphone is low, for example, below 20%, a command is sent to the terminal device. After receiving the command, the terminal device collects and enables the noise cancellation mode of the earphone, and identifies and calculates the similarities. In response to obtaining the voiceprint features with similarities greater than the first preset threshold, a preset command is sent to the earphone to instruct the earphone to disable the noise cancellation mode or enable the transparency mode.

In this way, power consumption of the noise-cancelling earphone can be saved, and its battery life can be extended. Therefore, the voiceprint of the interlocutor can be detected without negatively impacting the battery life, which is conducive to improving user experience of this product.

It should be noted that all of the above-mentioned embodiments disclosed in the present disclosure can be freely combined, and the technical solutions obtained after any such combination should also fall within the scope of the present disclosure.

Figure 6:
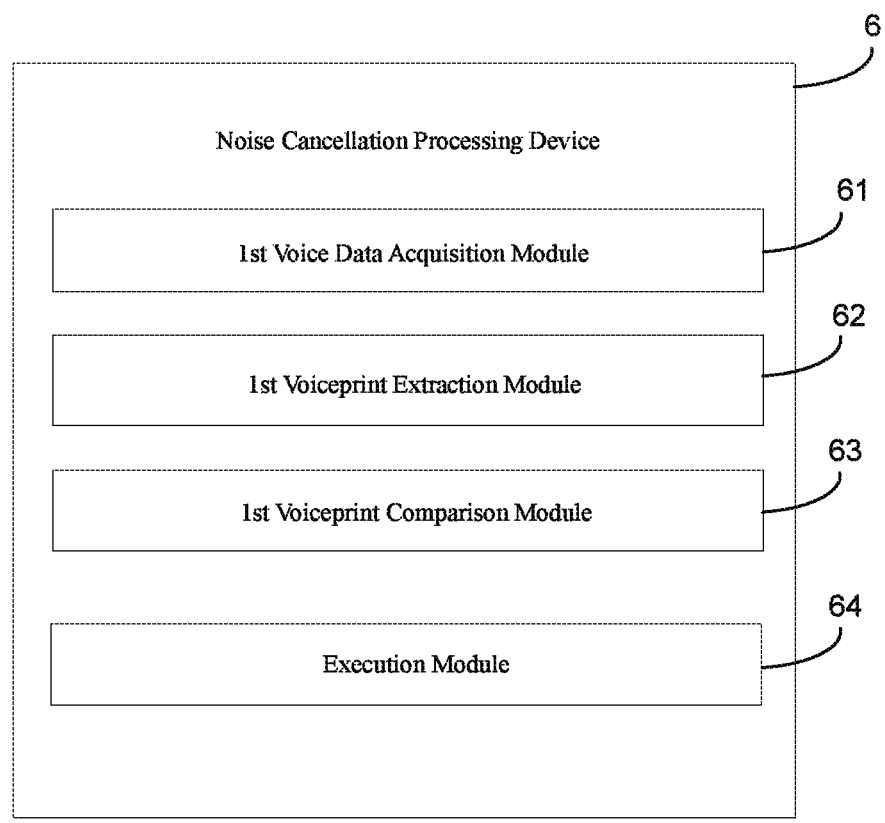
FIG. 6 is a schematic structural diagram of a noise cancellation processing device disclosed in one embodiment of the present disclosure.

As shown in FIG. 6, one embodiment of the present disclosure further discloses a noise cancellation processing device 6, which includes a first voice data acquisition module 61, a first voiceprint extraction module 62, a first voiceprint comparison module 63, and an execution module 64.

The first voice data acquisition module 61 is configured to collect first voice data in a surrounding environment in response to detecting that a noise-cancelling earphone is in a wearing status and a noise cancellation mode is enabled.

The first voiceprint extraction module 62 is configured to extract to-be-recognized voiceprint feature information according to the first voice data.

The first voiceprint comparison module 63 is configured to identify similarities between registered voiceprint feature information stored in a registered voiceprint database and the to-be-recognized voiceprint feature information entry by entry.

The execution module 64 is configured to, in response to at least one of the similarities being greater than a first preset threshold, perform a preset action in the noise-cancelling earphone.

It should be noted that the noise cancellation processing device of the present disclosure also includes other existing functional modules that support the operation of the noise cancellation processing device. The noise cancellation processing device shown in FIG. 6 is provided only as an example, and should not impose any limitation on functions and scopes of use of the embodiments of the present disclosure.

The noise cancellation processing device in this embodiment is used to implement the above noise cancellation processing method. Therefore, for the specific implementation steps of the noise cancellation processing device, reference can be made to the above descriptions of the noise cancellation processing method, and will not be repeated herein.

In the noise cancellation processing method and the noise cancellation processing device provided by the present disclosure, the voice data in the environment is detected, and in response to recognizing the registered voiceprint feature information, a preset action is performed in the noise-cancelling earphone, such as disabling the noise cancellation mode, addressing issues where wearers of the earphone being non-responsive to other people, thus improving the communication experience between the wearer and others.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A noise cancellation processing method, comprising:
   collecting first voice data in an environment surrounding a noise-cancelling earphone in response to the noise-cancelling earphone being in a wearing state and a noise cancellation mode being enabled;
   extracting to-be-recognized voiceprint feature information according to the first voice data;
   identifying similarities between registered voiceprint feature information stored in a registered voiceprint database and the to-be-recognized voiceprint feature information entry by entry;
   in response to at least one of the similarities being greater than a first preset threshold, performing a preset action in the noise-cancelling earphone, such that an external sound is transmitted to a target user wearing the noise-cancelling earphone,
   wherein, before the step of identifying the similarities between the registered voiceprint feature information stored in the registered voiceprint database and the to-be-recognized voiceprint feature information entry by entry, the noise cancellation processing method further comprises registering specified voiceprint feature information to form the registered voiceprint database.

2. The noise cancellation processing method according to claim 1, wherein, before the step of identifying the similarities between the registered voiceprint feature information stored in the registered voiceprint database and the to-be-recognized voiceprint feature information, the noise cancellation processing method further comprises:
   collecting second voice data corresponding to historical dialogues of the target user wearing the noise-cancelling earphone in a past first preset time period; and
   extracting all voiceprints in the second voice data, and registering N ones of the voiceprints with highest frequencies among all of the voiceprints to form the registered voiceprint database, wherein N is an integer greater than or equal to 1.

3. The noise cancellation processing method according to claim 1, wherein the registered voiceprint feature information further includes location information, and before the step of identifying the similarities between the registered voiceprint feature information stored in the registered voiceprint database and the to-be-recognized voiceprint feature information, the noise cancellation processing method further comprises:
   grouping the registered voiceprint feature information based on the associated location information to form a first mapping relationship that defines a correspondence between the location information and at least one voiceprint group;
   obtaining a current location information of the noise-cancelling earphone; and
   determining, based on the first mapping relationship, a target voiceprint group that matches with the current location information.

4. The noise cancellation processing method according to claim 1, wherein the step of collecting the first voice data in the environment further includes:
   simultaneously collecting current location information of the noise-cancelling earphone.

5. The noise cancellation processing method according to claim 4, wherein the step of identifying the similarities between the registered voiceprint feature information stored in the registered voiceprint database and the to-be-recognized voiceprint feature information entry by entry further includes:
   establishing a training set based on historical dialogue data of the target user wearing the noise-cancelling earphone at different locations;
   training, based on the training set, a preset network model to obtain an initial network model, wherein parameter weights for a same interlocutor at different locations in the initial network model are different, and the parameter weights are associated with the locations;
   determining, based on the current location information, the parameter weights in the initial network model to form a target network model; and
   identifying, based on the target network model, the similarities between the registered voiceprint feature information stored in the registered voiceprint database and the to-be-recognized voiceprint feature information entry by entry.

6. The noise cancellation processing method according to claim 5, wherein the step of establishing the training set based on the historical dialogue data of the target user wearing the noise-cancelling earphone at different locations includes:
   acquiring the historical dialogue data of the target user wearing the noise-cancelling earphone at different locations within a historical time period to serve as initial training data, wherein the historical dialogue data includes data on changes in a worn or unworn status of the noise-cancelling earphone within a preset time period after a start of a dialogue;
   selecting, from the initial training data, the historical dialogue data corresponding to a switching of the noise-cancelling earphone from the wearing state to a non-wearing state within the preset time period after the start of the dialogue to serve as target training data; and
   establishing the training set based on the target training data.

7. The noise cancellation processing method according to claim 1, further comprising:
   acquiring the registered voiceprint feature information corresponding to the similarities greater than the first preset threshold as a target voiceprint, and continuing to collect third voice data from the surrounding environment; and
   in response to the target voiceprint and the voiceprint feature information of the target user not being recognized from the third voice data within a second preset time period, enabling the noise cancellation mode of the noise-cancelling earphone.

8. The noise cancellation processing method according to claim 1, wherein the step of collecting the first voice data in the environment further includes:

collecting voice data with an audio intensity greater than a second preset threshold in the environment surrounding the noise-cancelling earphone as the first voice data.

9. The noise cancellation processing method according to claim 1, wherein the step of identifying the similarities between the registered voiceprint feature information stored in the registered voiceprint database and the to-be-recognized voiceprint feature information entry by entry further includes:

in response to detecting that a power of the noise-cancelling earphone is lower than a third preset threshold and that a connection between the noise-cancelling earphone and a terminal device is established, disabling the noise cancellation mode of the noise-cancelling earphone.

10. The noise cancellation processing method according to claim 1, wherein the preset action is to disable the noise cancellation mode or enable a transparency mode.

11. A noise cancellation processing device for implementing the noise cancellation processing method according to claim 1, the noise cancellation processing device comprising:

a first voice data acquisition module configured to collect first voice data in an environment surrounding a noise-cancelling earphone in response to detecting that the noise-cancelling earphone is in a wearing state and a noise cancellation mode is enabled;

a first voiceprint extraction module configured to extract to-be-recognized voiceprint feature information according to the first voice data;

a first voiceprint comparison module configured to identify similarities between registered voiceprint feature information stored in a registered voiceprint database and the to-be-recognized voiceprint feature information entry by entry;

an execution module configured to, in response to at least one of the similarities being greater than a first preset threshold, perform a preset action in the noise-cancelling earphone, such that an external sound is transmitted to a target user wearing the noise-cancelling earphone;

wherein, before the step of identifying the similarities between the registered voiceprint feature information stored in the registered voiceprint database and the to-be-recognized voiceprint feature information entry by entry, specified voiceprint feature information is registered to form the registered voiceprint database.

12. A noise cancellation processing apparatus, comprising:

a processor;

a memory storing an executable program for the processor;

wherein the processor is configured to perform steps of the noise cancellation processing method as claimed in claim 1 by executing the executable program.

* * * * *